United States Patent [19]
Intrater et al.

[11] Patent Number: 5,822,779
[45] Date of Patent: Oct. 13, 1998

[54] MICROPROCESSOR-BASED DATA PROCESSING APPARATUS THAT COMMENCES A NEXT OVERLAPPING CYCLE WHEN A READY SIGNAL IS DETECTED NOT TO BE ACTIVE

[75] Inventors: Gideon Intrater, Ramat-Gan; Ohad Falik, Petach-Tikva; Aharon Ostrer, Hertzelia; Yair Baydatch, Ramat-Hasaron; Alberto Sandbank, Natania, all of Israel

[73] Assignee: National Semiconductor Corporation, Santa Clara, Calif.

[21] Appl. No.: 821,416

[22] Filed: Mar. 21, 1997

Related U.S. Application Data

[63] Continuation of Ser. No. 416,489, Apr. 4, 1995, abandoned, which is a continuation of Ser. No. 989,217, Dec. 11, 1992, abandoned.

[51] Int. Cl.[6] .................................................... G06F 13/18
[52] U.S. Cl. ....................... 711/168; 711/169; 395/309; 395/287
[58] Field of Search .................................. 395/427, 494, 395/495, 496, 559, 309, 287

[56] References Cited

U.S. PATENT DOCUMENTS

| | | | |
|---|---|---|---|
| 4,388,687 | 6/1983 | Twibell et al. | 711/202 |
| 4,583,168 | 4/1986 | Pang et al. | 711/102 |
| 4,958,276 | 9/1990 | Kiuchi et al. | 711/167 |
| 4,979,103 | 12/1990 | Kida et al. | 395/595 |
| 5,067,077 | 11/1991 | Wakimoto et al. | 395/490 |
| 5,136,691 | 8/1992 | Baror | 711/139 |
| 5,193,167 | 3/1993 | Sites et al. | 711/163 |
| 5,201,036 | 4/1993 | Yoshimatsu | 395/287 |
| 5,250,940 | 10/1993 | Valentaten et al. | 345/509 |
| 5,265,211 | 11/1993 | Amini et al. | 395/856 |
| 5,282,272 | 1/1994 | Guy et al. | 395/296 |
| 5,404,486 | 4/1995 | Frank et al. | 711/169 |
| 5,438,670 | 8/1995 | Baror et al. | 711/169 |
| 5,469,544 | 11/1995 | Aatresh et al. | 711/169 |
| 5,581,745 | 12/1996 | Muraoka et al. | 711/167 |

FOREIGN PATENT DOCUMENTS 0 238 090   9/1987   European Pat. Off. .

OTHER PUBLICATIONS

D. S. Laffitte, 'Fast On–Chip Memory Extends 16–Bits Family's Reach' Electronics, vol. 54, No. 44, 24 Feb. 1981, New York US, pp. 157–161.

"Intel Microprocessor and Peripheral Handbook, vol. I–Microprocessor", Intel Corporation Dec. 1988, pp. 4–14, 4–58, 4–59, 4–75 to 4–81, 4–84, and 4–85.

*Primary Examiner*—Eddie P. Chan
*Assistant Examiner*—Reginald G. Bragdon
*Attorney, Agent, or Firm*—Limbach & Limbach, L.L.P.

[57] ABSTRACT

A data processing technique with which a CPU core accesses memory devices over a bus. Some of the memory devices are on-chip, and some may be off-chip. In order to optimize its operation, the CPU core accesses the on-chip devices via a core buffer interface unit ("BIU") which has been tuned to on-chip operation. Off-chip devices communicate with the CPU core via a system BIU which translates the on-chip bus transactions to meet the off-chip device requirements.

2 Claims, 14 Drawing Sheets

MICROPROCESSOR-BASED DATA PROCESSING APPARATUS THAT COMMENCES A NEXT OVERLAPPING CYCLE WHEN A READY SIGNAL IS DETECTED NOT TO BE ACTIVE

CROSS-REFERENCE TO RELATED APPLICATIONS

This application is a continuation of application Ser. No. 08/416,489, filed Apr. 4, 1995 (now abandoned) which is a continuation of application Ser. No. 07/989,217, filed Dec. 11, 1992 (now abandoned).

BACKGROUND OF THE INVENTION

The present invention relates to a data processing technique with which a central processing unit ("CPU") core accesses memory devices over a bus and, in particular, to a method and apparatus for improving an embedded processor system by tuning such bus for accessing on-chip memory devices.

A microprocessor-based data processing system is likely to include a CPU core operating with on-chip and off-chip memory devices which are, for example, memories, memory-mapped I/O, memory-mapped peripherals and memory-mapped coprocessors, or any other device which has a special protocol and is accessed by the CPU core as part of its memory space. Examples of such a protocol are the NS32CG16 bus, the MC68020 bus, or the Intel 8086 bus. The term "memory space" includes the program and data memory space and, if available, a separate I/O address space (in some architectures, such as in the Intel 8086 processors, this section is separate). A CPU core includes hardware and software elements that represent a programming and execution model. The model is implemented by a particular execution unit which performs the functions of instruction fetch and decode, operand fetches, instruction execution, and result write into a destination. The Motorola CPU32 is the core CPU for some of the Motorola MC68000 family of processors, for example.

Data processing technology has moved toward designing embedded processor systems, also known as Application Specific Processors (ASP's). The two terms will be used below interchangeably. As part of this technology, a CPU core must access memory devices and operate in such a way as to be targeted at specific applications such as laser beam printers, facsimile machines and communication systems. The memory devices are on-chip and/or off-chip. A bus of the CPU core is instrumental in accessing these memory devices.

Configurations for connecting a CPU core to off-chip devices via an existing system bus interface unit ("BIU") are well known and, in order to better integrate the system and reduce its cost, embedded processors have been designed by simply moving some of the off chip devices to be on the chip. Thus, currently used approaches for implementing embedded processor technology simply connect on-chip devices to an existing general purpose CPU core via a BIU tuned for operation with off-chip devices. This approach, and its shortcomings, will be described in connection with an ASP available from National Semiconductor Corp. ("NSC") under its part no. NS32AM160 shown in FIG. 1 as unit 1. All the blocks of FIG. 1 represent on chip circuitry.

As shown in FIG. 1, unit 1 has a general purpose CG core 3. (Note: "CG" is simply a designation assigned by NSC to this component and should not be regarded as having any other significance). CG core 3 is a 32 bit processor with a 16 bit bus and an address space of 4 Gbytes. As shown in detail by FIG. 2, CG core 3 includes graphics logic 6, microcode ROM and control logic 7, an 8-byte queue 8, pipelined displacement and immediate extractor 9, register files 10, arithmetic logic unit (ALU) 11, working register 12, direct memory access ("DMA") control 13, programmable bus timing 14, and clock generator 15. These are all well known elements and, therefore, providing details thereof is not deemed to be necessary. Of particular importance to the present invention is pipelined bus interface control 16 which functions as a BIU for the core. CG core 3 communicates signals via its core BIU on a 16-bit multiplexed address/data bus 17.

As shown in FIG. 1, bus 17 couples CG core 3 with ROM 18, RAM 19, DSPM 5, I/O ports 20, ICU 21, PWM 22, DSPM RAM 23, clock unit 24 and WD 25, as well as off-chip devices (not shown) via BIU-and-DRAM controller 26. DSPM 5 is a high performance execution unit for performing digital signal processing tasks. The task of WD 25 is to reset the software in case of an error that causes it to lose control. It is known under the NSC trademark WATCHDOG. PWM 22 (pulse width modulator) generates a square wave with a fixed frequency and a variable duty cycle. ICU 21 is an interrupt control unit which gathers interrupts from a few sources and interfaces the CPU core using a vectored interrupt protocol. BIU 26 is the system BIU because it communicates on-chip signals from on-chip bus 17 to an off-chip bus and off-chip devices. For example, the NS32AM160 ASP interfaces DRAM devices and static memories. The system BIU 26 has the task of generating the required controls and bus protocols to meet the requirements of these memories. This type of feature cannot be part of the core BIU due to the large variety of application requirements.

CG core 3 has been designed for general use in various types of applications. Its core BIU 16 has, thus, been tuned for operation with off-chip devices. The term "tuned", and variations thereof used herein such as "tuning", refer to selecting the optimum one from among alternative solutions based on the specific tasks and applications to which the bus is applied. The considerations involved are: required performance, device cost in terms of die size and package pin count, and system cost. Such optimization ideally maximizes performance while minimizing the device cost and the system cost. However, for specific applications in order to attain a required level of performance a tradeoff may be required as, for example, increasing the pin count (thereby increasing the device cost) to make it possible to use less expensive memory (thereby decreasing the system cost).

Since core BIU 16 has been tuned for operation with off-chip devices, it includes components which are redundant for the implementation of FIG. 1. For example, the multiplexed address/data bus 17 of the CG core is generated using dedicated hardware (i.e. multiplexer and control—not shown) in order to reduce the number of pins in such a general purpose controller. However, unit 1 must provide separate system address and data buses to meet the requirements of the off-chip devices and the external memory. Therefore, system BIU 26 includes hardware that demultiplexes the address and data it receives from core BIU 16. Also, demultiplexing is done by every on-chip peripheral (e.g. SRAM, ROM, etc.) which is not coupled to the system BIU. Moreover, some systems may not need a system BIU at all (i.e. no external bus) and, therefore, the multiplexing by the CG core is superfluous. In addition, CG core 3 generates a set of control signals which are required by external devices to support the multiplexed bus (e.g. address strobe and buffer enable), which are only used, on-chip, for demultiplexing the bus.

The CG core basic bus cycle is four clock cycles. One clock cycle is required for the address output, one for address float, one for data transfer, and the fourth clock cycle for data float. However, on-chip memories and peripherals can be accessed in one clock cycle, with no penalty in cost or power consumption. This potential performance increase cannot be exploited due to the four clock cycles limitation imposed by the core BIU 16.

To summarize, an ASP based on existing and well known general purpose processors includes two BIU's. The first is the core BIU. It has unused features and, in some cases, features that require performance of unnecessary tasks by the other BIU. The second BIU ("system BIU") interfaces the external system. It is designed to meet the specific requirements of the application and, therefore, cannot be included in the CPU core. Such an arrangement involves hardware that is unnecessary because it is not required in the ASP of FIG. 1. More specifically, the hardware may be redundant due to the inclusion of unused features (such as dynamic bus width or burst memory support), or due to the need to perform a task although it later must be reversed (such as multiplexing and then demultiplexing address data). In addition, on-chip access performance is degraded by accessing on-chip devices with a slow off-chip bus protocol.

SUMMARY OF THE INVENTION

A microprocessor-based data processing apparatus includes a central processing unit ("CPU") core and at least one memory device integrated on-chip with said CPU core and mapped into a memory map of the CPU core for storing data at assigned address locations. The apparatus also includes a data bus and an address bus.

Accessing means is provided for communicating said CPU core with said at least one memory device via said data bus and said address bus by READ and/or WRITE transactions carried out during bus cycles, one of said transactions being completable during one of said bus cycles, each of said bus cycles being a two state cycle having a first state and a second state, said first state for one of said bus cycles overlapping said second state for an immediately preceding one of said bus cycles, so that said accessing means achieves a one cycle throughput and a two cycle latency.

A control bus is also provided. The accessing means samples the control bus during said second state of each one of said bus cycles and each one of said wait states, if any, to detect whether a cycle extension control signal is active. In response to said cycle extension control signal being detected to be active, said accessing means extends said current bus cycle by a wait state and delays a succeeding bus cycle by the wait state. Alternately, in response to said cycle extension control signal not being detected to be active, said accessing means commences a first state of a succeeding bus cycle during the second state of said current bus cycle.

The second accessing means has means for translating transactions on the internal bus to requirements of the at least one second memory device.

A further aspect of the invention is directed to a method for accessing at least one memory device integrated on-chip with a CPU core in a microprocessor-based data processing apparatus which includes the following steps. The CPU core is communicated with the at least one memory device via a bus. The communication is tuned to on-chip operation with the at least one memory device.

Yet another aspect of the invention is directed to a method for accessing at least one first memory device integrated on-chip with a CPU core and at least one off-chip second memory device in a microprocessor-based data processing apparatus which includes the following steps. The CPU core is communicated with the at least one first memory device via an internal bus. The communication via the internal bus is tuned to on-chip operations with the at least one first memory device. The CPU core is communicated with the at least one off-chip second memory device via an external bus. Transactions on the internal bus are translated to requirements of the at least one second memory device to effect the communication between the CPU core and the at least one second memory device.

DETAILED DESCRIPTION OF THE INVENTION

Figure 3:
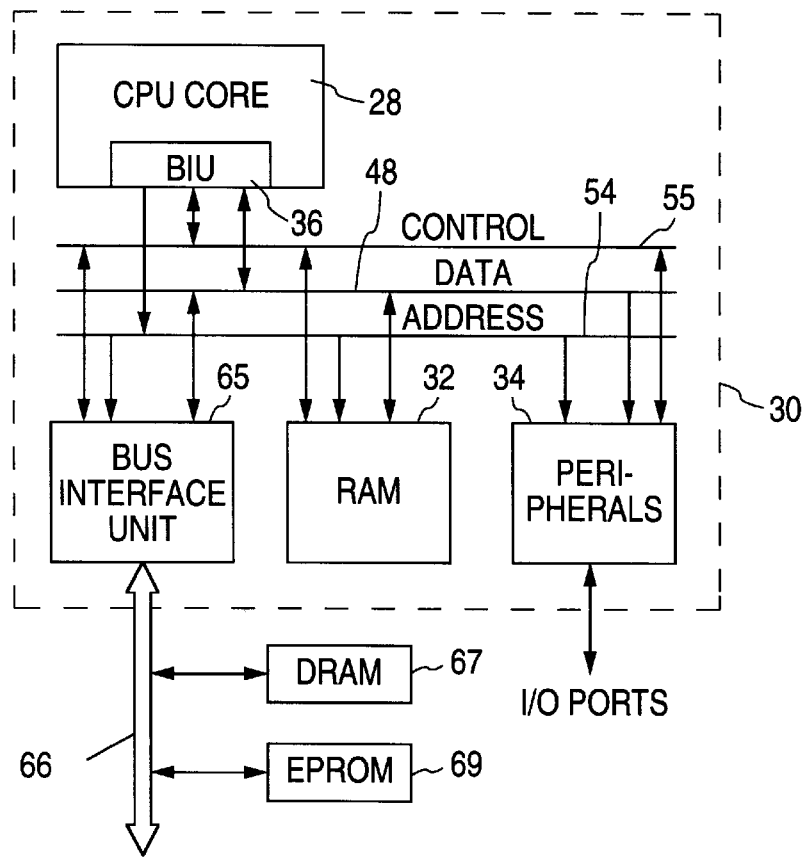
FIG. 3 is a schematic block diagram illustrating an embedded processor system architecture in accordance with the invention, and having off-chip devices.
Figure 4:
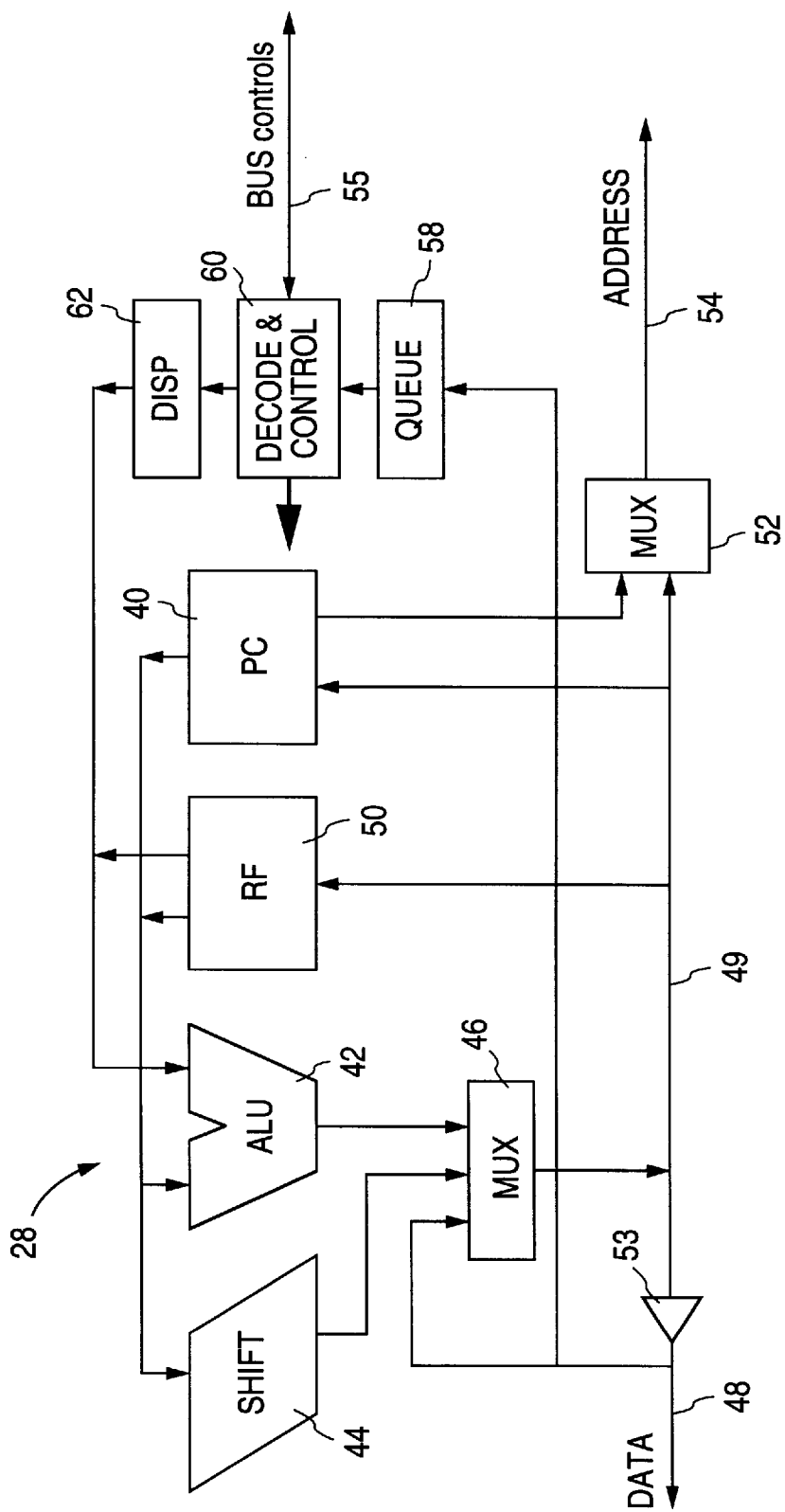
FIG. 4 shows details of a CPU core used to implement the invention.

As shown in FIG. 3, CPU core 28 fabricated on semiconductor chip 30 is coupled to on-chip devices such as RAM 32 and peripherals 34 via core BIU 36, data bus 48, address bus 54 and control bus 55. BIU 36 has been shown representationally in FIG. 3 as being a part of CPU core 28. However, it need not be in the form of an identifiable set of hardware components. Instead, BIU 36 can be a part of CPU core 28 commonly known as the execution unit state machine. This is especially true when the BIU performs operations that are directly related to the processed program instructions (such as LOAD, STORE and memory accesses related to exception handling). The simplified bus arrangement of the present invention, with BIU 36 being tuned for accessing on-chip devices, will be described in connection with a 32-bit RISC CPU core with a LOAD/STORE architecture. An example of such a CPU core is shown in FIG. 4.

In CPU core 28, program counter ("PC") 40 is a counter, or more accurately an incrementer, having its output coupled to arithmetic logic unit ("ALU") 42 and barrel-shifter 44. Multiplexer ("MUX") 46 receives the outputs of ALU 42 and barrel-shifter 44, and another input provided thereto is a data signal (explained below) on data bus 48. MUX 46 provides an output over result bus 49 to buffer 53, register file 50, PC 40 and MUX 52, with the output of the latter being coupled to address bus 54. Buffer 53 is oriented to drive outgoing signals from MUX 46 onto data bus 48. The buffer will drive data onto data bus 48 only during the appropriate time of the write cycle. Buffer 53 will be in tri-state (inactive state) the rest of the time.

Displacement circuitry ("DISP") 62 provides the data for computations in which the data is in immediate mode (part of the program stream). This is also true for displacements in memory reference.

Queue 58 receives the data read from memory on bus 48 during the fetch instructions. A fetch instruction is issued by the control section of decode and control circuit 60 whenever the bus is available and the queue is not full. The queue receives the instructions on a 32 bit data bus and handles the alignment of an instruction according to its address (an instruction may start on the lower or higher 16 bits of the bus, and may be more than one word long). The decode section of circuit 60 decodes the instructions at the top of the queue, and executes them. After an instruction is decoded, it is removed from the queue to make room for the next one (i.e. a FIFO operation). The decode and control circuit 60 activates the rest of CPU core 28 in accordance with the contents of the decoded instructions. For example, if the instruction is to add the contents of one register to the contents of another register, the following steps will be performed. Two registers will be read from register file 50 to the two inputs of ALU 42, respectively. The ALU then receives and executes an add command, and MUX 46 routes the ALU's resulting output back to the appropriate register in register file 50 via result bus 49.

ALU 42 performs logic (AND, OR, XOR, etc.) and arithmetic (ADD, SUBTRACT, etc.) operations on operands read from register file 50. In shift operations, the operand is read from the register file to the input of barrel-shifter 44. The shift result is directed by the control circuit 60 from the output of barrel-shifter 44 through MUX 46 and back to register file 50 via result bus 49.

For branch and jump instructions, the new value in PC 40 is calculated in ALU 42 which adds a displacement received from DISP 62 to the current value read from PC 40. The result is used as an address for a new fetch command through MUX 52, and it is also stored into PC 40 for future use. PC 40 is capable of incrementing its content by 2 or 4 each time an instruction is fetched from memory. This is necessary because data is fetched only as a word (i.e. 2 bytes) or a double word (i.e. 4 bytes).

LOAD and STORE instructions are used in order to read and write data to the memory. A LOAD instruction reads 1, 2 or 4 bytes from a memory (not shown). The address of the data is generated by adding in the ALU the contents of a register (read from register file 50) to a displacement value (read from DISP unit 62, or zero). The addition result passes through MUX's 46 and 52 to address bus 54. The data read from the memory is received on data bus 48 and from it, through MUX 46, it is written to register file 50. If data alignment is required, the data is then shifted through barrel-shifter 44 (as explained in detail below) and again written to register file 50. In STORE operations, the address generation is performed just as described above for the LOAD. The data is read from register file 50, aligned by barrel-shifter 44 (as explained below) and written to data bus 48 through MUX 46 and buffer 53.

CPU core 28 has three main parts, namely an instruction loader, an execution unit and a control logic. The instruction loader, which includes queue 58, PC 40 and MUX 52, loads instructions from the external system and provides them to the execution unit for execution. The execution unit includes register file 50, ALU 42, barrel-shifter 44, DISP 62 and buffer 53. The control logic, which includes block 60, controls the instruction loader, execution unit and the interface to the CPU core. Instructions are fetched from bus 48 into instruction queue 58, are decoded by circuit 60, and then sent to the execution unit for execution. The control logic of block 60 selects which of the resources in the execution unit is used for each instruction. More specifically, on arithmetic and logic instructions, operands are read into ALU 42 or barrel-shifter 44, and the result is written to a destination register in register file 50. On LOAD instructions, ALU 42 computes the effective memory address, and the source operand is written to the memory via bus 48. For branch and jump instructions, a target address is computed with ALU 42 by adding the current content of PC 40 to a displacement value in DISP 62, and the result is written into PC 40.

The width of core buses 48, 54 and 55 is fixed at, for example, 32 bits in the CPU core of the preferred embodiment (although other widths are selectable, of course), and all accesses on it are aligned. The CPU core performs the data alignment in order to permit a direct connection from data bus 48 to the on-chip memory devices. Such alignment can be done by providing a dedicated aligner (not shown) on data bus 48. However, the data alignment is preferably carried out by the CPU core, as described below. There is no need for bus widths other than 32-bit on-chip even though each read or write transaction on the bus may access 8, 16 or 32 bits of data. Support for bus widths other than 32-bit in the external system is provided by the system BIU 65, as discussed below.

In accordance with a preferred embodiment of the present invention, the data alignment is carried out with existing circuitry of a CPU core rather than with a dedicated alignment multiplexer, as is common in the prior art. A dedicated alignment multiplexer adds delay to the time-critical data path to/from memory because it is activated in every memory cycle even if alignment is not needed. Also, a dedicated alignment multiplexer and its control logic enlarge the silicon die area and consume additional power.

In contrast, data alignment is performed by the present invention with barrel-shifter 44 which is part of the execution unit of the CPU core. The barrel-shifter is normally used to perform shift-related instructions. A 32-bit barrel-shifter shifts 32 bits n positions in one cycle, where n is any value between 0 and 31. In a RISC LOAD/STORE architecture, such as is utilized in the present invention, the barrel-shifter is not used for arithmetic tasks during the LOAD/STORE operation and, thus, it is available to perform data alignment. How this is done is described below in detail with regard to FIGS. 5 to 8.

Figure 5:
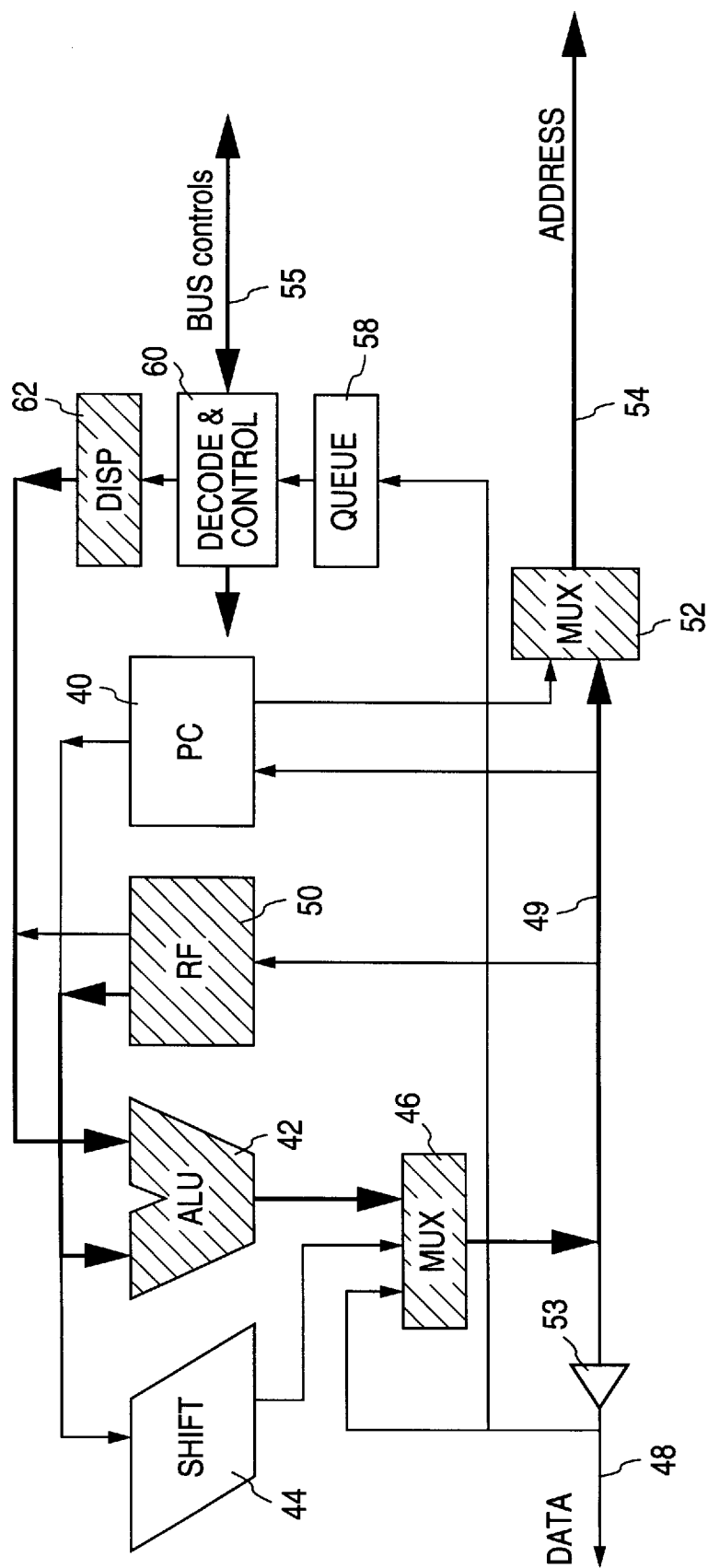
FIG. 5 illustrates generating an address for STORE and LOAD operations.
Figure 6:
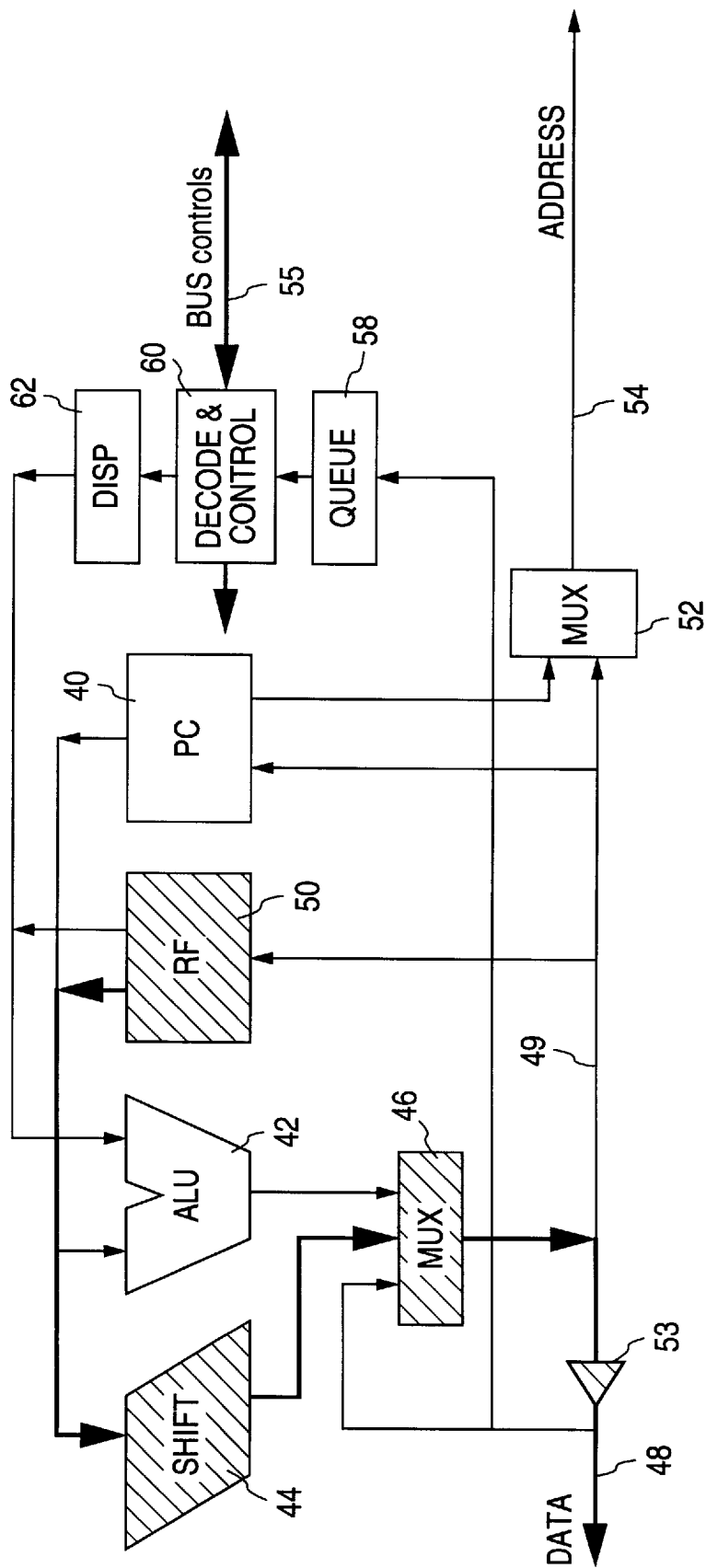
FIG. 6 illustrates a second cycle of the STORE operation in which data alignment is performed.

FIGS. 5 and 6 illustrate data alignment when data is written to memory ("STORE"). FIG. 5 shows that the first STORE cycle calculates the memory address by combining the contents of DISP 62 and register file 50 in ALU 42, as already explained above. The address is issued via MUX's 46 and 52 on address bus 54. In the second STORE cycle, as shown in FIG. 6, the data to be stored from register file 50 is aligned through barrel-shifter 44 and put on data bus 48 via MUX 46 and buffer 53. This sequence entails no performance penalty because the memory device (not shown) expects the data one cycle after the address is issued.

Figure 7:
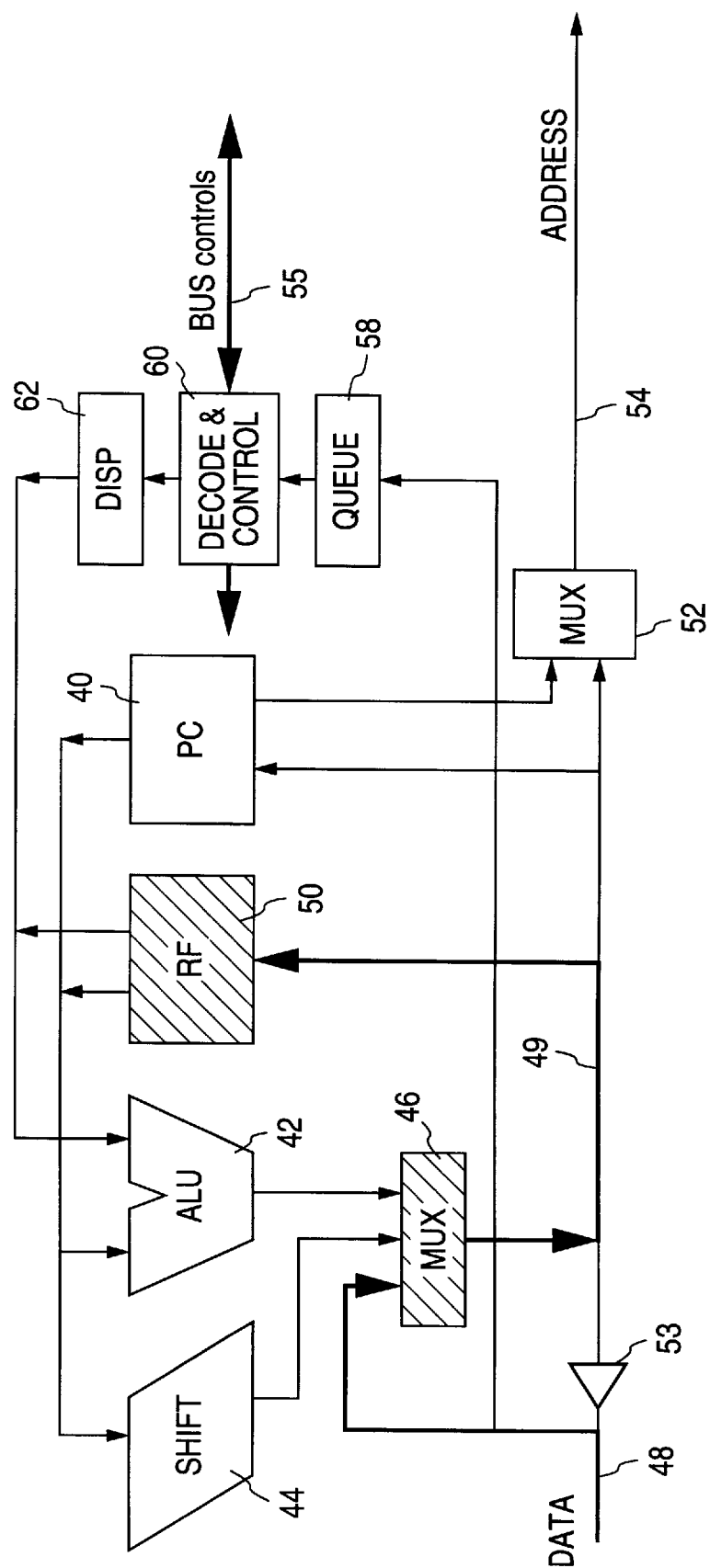
FIG. 7 illustrates a second cycle of the LOAD operation.
Figure 8:
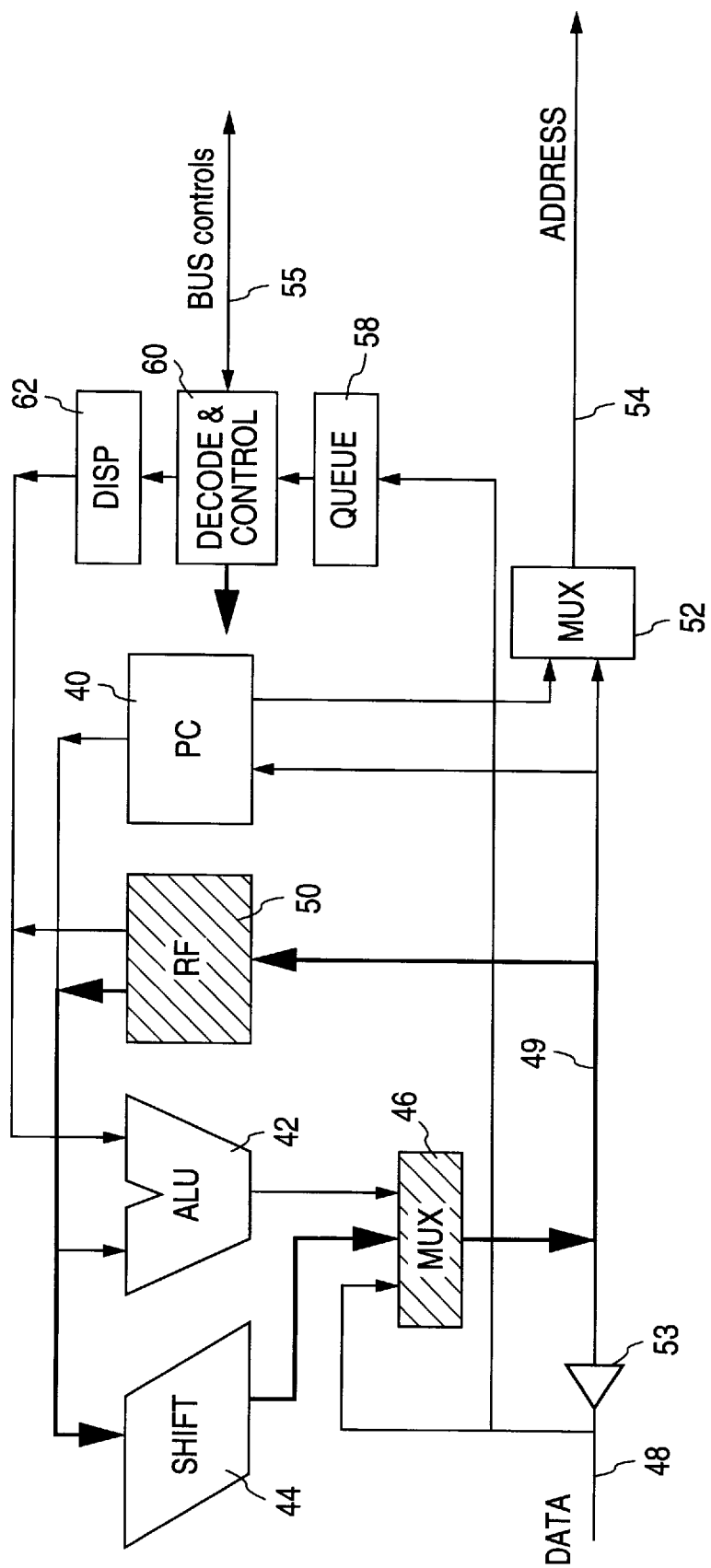
FIG. 8 illustrates a third cycle of the LOAD operation in which data alignment is performed.

FIGS. 7 and 8 illustrate data alignment when reading data from memory ("LOAD"). The first LOAD cycle calculates the memory address and issues it on address bus 54 in the same manner as shown in FIG. 5. In the second LOAD cycle, as shown in FIG. 7, the fetched data on data bus 48 is read into a temporary register, provided in register file 50, via MUX 46 and result bus 49. Such a temporary register is normally a part of register file 50 for use in LOAD execution and for calculating vector addresses during execution of an interrupt. A temporary register holds temporary (e.g. partial) results only during the execution process of the CPU core, and is not part of the programming model (i.e. it is not visible to the software but only to the hardware designer). In the third LOAD cycle, as shown in FIG. 8, the contents of the temporary register are aligned through barrel-shifter 44 and then written back into register file 50 via MUX 46 and result bus 49.

It is recognized that use of a dedicated alignment multiplexer rather than the just-described technique would save the third LOAD cycle. However, in most applications the majority of LOAD instructions access double-words. Since these are always aligned, no alignment is required and the just-described technique, therefore, does not incur any performance penalty. Furthermore, not all the remaining word and byte accesses incur a performance penalty. For example, in case a data byte in a LOAD is placed on the lowest byte of the bus (i.e. bits 0–7), and in case a data word in a LOAD is placed on the lower half of the bus (i.e. bits 0–15), there is no need for the third LOAD cycle because data alignment is not required. Thus, this technique does not degrade the execution time for STORES, while the access time for a small fraction of LOADs is increased from 2 cycles to 3. This is a small price to pay considering that removal of the dedicated alignment multiplexer provides the following advantages: saving of die area otherwise occupied by the dedicated alignment multiplexer and its control logic, and saving the time delays caused by it to the time—critical data path to/from memory. Part of the existing control logic, normally used for shift-related instructions, can also be utilized for alignment control, thereby saving additional die area.

CPU core 28 communicates with other devices in the system using address, data and control buses by performing a sequence of actions called a "bus cycle". Controllers for a DMA unit which is separate from the CPU core can request control of a bus from the CPU core in order to initiate their own data transfers. The CPU core uses a 2-signal handshake to receive and acknowledge these bus requests, such as a HOLD—HOLD acknowledge ("HOLD/HOLDA"). The CPU core receives and responds to external requests for exceptions, including interrupts, and reset. It also displays information concerning its internal activity, such as completion of an instruction execution. The ability to extend bus cycles and to cancel them is also provided. This operation will be evident from TABLE 1 which shows a summary of the interface signals for the CPU core, arranged in alphabetical order.

TABLE 1

| Symbol | Width | Signal Name | I/O | Time Class | Tri-State |
|--------|-------|-------------|-----|------------|-----------|
| SFADP | 32 | Address Bus | O | 1 s | Yes |
| SFBEP | 4 | Byte enable (0–3) | O | 1 s | Yes |
| SFCANP | 1 | Cancelled transaction | O | 1 v | Yes |
| SFDTP | 32 | Data bus | I/O | 2 v | Yes |
| SFHLDAP | 1 | Hold acknowledge | O | 1 s | No |
| SFHOLDP | 1 | Hold request | 1 | 2 s | No |
| SFICLCKP | 1 | IC Lock | O | 1 s | No |
| SFINTP | 1 | Vectored interrupt | 1 | 2 s | No |
| SFISEP | 1 | Debug interrupt | 1 | 2 s | No |
| SFNMIP | 1 | Non-maskable interrupt | 1 | 2 s | No |
| SFNSFP | 1 | Internal non-sequential fetch | O | 1 s | No |
| SFPFSP | 1 | Program flow status | O | 1 s | No |
| SFPHI1P | 1 | PHI1 clock | 1 | 1 phi | No |
| SFPHI2P | 1 | PHI2 clock | 1 | 2 phi | No |
| SFRDP | 1 | Data read | O | 1 s | Yes |
| SFRDYP | 1 | Ready | 1 | 2 s | No |
| SFRSTP | 1 | Reset | 1 | 2 s | No |
| SFSTP | 3 | Status (0–2) | O | 1 s | No |
| SFTAN | 1 | Ta Bus cycle | O | 2 p | No |
| SFWRP | 1 | Data write | O | 1 s | Yes |

The time class is an attribute used in two-phase methodology which is a common VLSI method. The symbols of the different time classes used in TABLE 1 are briefly described as follows:

1s—A signal that is stable during the PHI1 period. Its value is available from before the PHI1 high period starts until after it is finished.

2s—The same as 1s, but for PHI2 high period.

1v—A signal that is valid at the end of the PHI1 high period.

2v—The same as 1v, but for PHI2 high period.

1p—PHI1 precharge signal. (This type of signal is similar to the technology known as open collector in TTL logic). At PHI2 the signal is charged to "1". At PHI1, a source that needs to drive it can signal "0" by discharging the signal, or signal "1" by not discharging the signal. The signal's value is valid at the end of PHI1.

2p—The same as 1p, but with PHI1 and PHI2 exchanging their functions.

1phi—This is one of the two clock signals used in the two phase methodology. A clock cycle starts at the rising edge of PHI1.

2phi—This is the second of the two clock signals. It is high during the second phase of the clock. The high period of the PHI1 and PHI2 signals must have a non-overlapping period for proper operation.

The signals of TABLE 1 which are handled by the CPU core 28 are briefly described as follows:

Input Signals

SFISEP ISE Interrupt. When asserted, indicates ISE Interrupt request.

SFHOLDP HOLD Request. When asserted, causes the CPU core to release its buses.

SFINTP Vectored Interrupt. When asserted, indicates Vectored Interrupt request.

SFNMIP Non-maskable Interrupt. When asserted, indicates Non-maskable Interrupt request.

SFPHI1P PHI1 clock.

SFPHI2P PHI2 clock.

SFRDYP Ready. When this input is low (not asserted), the CPU core extends the bus cycle.

SFRSTP Reset. When asserted, the CPU core is initialized to a known state. Note: for the proper reset detection, the SFRSTP should be asserted for 10 cycles, at least.

Output Signals

SFADP Address Bus. Driven by the CPU core at Ta.phi2 bus cycle.

SFBEP0-3 Byte Enables. When asserted, selectively enables data reads and writes on bytes 0 through 3 of the data bus.

SFCANP Cancelled transaction. When asserted in the Tb of the read/write transaction (not fetch), indicates non-valid transaction because the NAD (non-aligned data) trap was detected in the LOAD/STORE instruction. When SFCANP is asserted, the system should prevent the write to the destination memory location. The read also should be prevented if it is destructive.

SFHLDAP HOLD Acknowledge. Asserted by the CPU core in response to the SFHOLDP input, to indicate that the CPU core has released the bus.

SFICLCKP Instruction Cache Lock. When asserted, locks the cache content.

SFNSFP Internal Non-Sequential Fetch. Indicates non-sequential fetch by the Queue 48.

SFPFSP Program Flow Status. Indicates the completion of execution for each instruction.

SFRDP Data Read. Indicates a data read bus cycle.

SFTAN Ta Bus Cycle. When asserted, indicates that the CPU core is in the Ta of a bus cycle.

SFSTP0-2 Bus Cycle Status. These signals encode the type of bus cycle.

SFWRP Data Write. Indicates a data write bus cycle.

Bidirectional Signals

SFDTPO-31 Data Bus. Used by the CPU core to input data during a read bus cycle or to output date during the write cycle.

The bus transactions handled by CPU core 28, or bus cycles, are as follows:

Bus Status

The CPU core performs bus cycles for one of the following reasons:

1. To fetch instructions from memory.
2. To write or read data to or from memory or peripheral devices. Peripheral input and output are memory-mapped in the CPU core architecture.
3. To acknowledge an interrupt (maskable, non-maskable or ISE).

The only external difference between these cases is the 3-bit code placed on the Bus Status pins (SFSTPO-SFSTP2). The various combinations on these pins indicate why the CPU core is performing a bus cycle. The Bus Status pins are interpreted as a 3-bit value (SFSTPO the least-significant bit). Their values are encoded as follows:

000 The bus is idle because the CPU core does not yet need to access the bus.

001 The bus is idle because the CPU core is waiting for an interrupt following execution of the WAIT instruction.

010 Interrupt Acknowledge Bus Cycle. The CPU core is performing read cycle from the address h'FFFFFE00 in the case of Maskable Interrupt, the address h'FFFFFF00 in the case of Non-Maskable Interrupt, or the address h'FFFFFC00 in the case of ISE acknowledge.

100 Sequential Instruction Fetch. The CPU core is fetching the next instructions in sequence from the instruction stream.

101 Non-Sequential Instruction Fetch. The CPU core is performing a non-sequential fetch of a new sequence of instructions. This occurs as a result of a Jump or Branch Instruction, an exception, and also after the execution of certain other instructions. After executing certain instructions or processing an exception, the CPU core serializes instruction execution. Serializing instruction execution means that the CPU core completes writing to memory all previous results of instructions, then begins fetching and executing the next instruction.

110 Data Transfer. The CPU core is reading or writing an operand for an instruction.

111 Exception Data Transfer. The CPU core is reading a value from the interrupt dispatch table while processing an exception.

Memory and Peripheral Bus Cycles

Bus T-States

Figure 9:
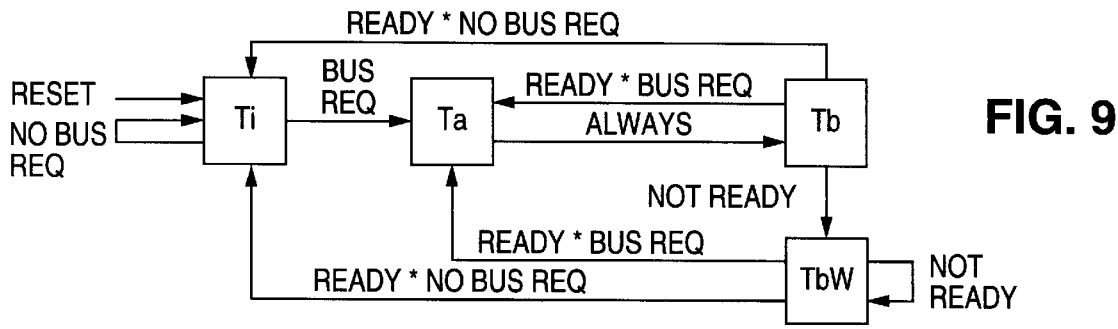
FIG. 9 is a simplified bus state diagram.

The basic bus cycles for address bus 54, data bus 48 and control bus 55 which are performed by the CPU core to read from and write to memory and peripheral devices occur during two cycles of the bus clock, namely Ta and Tb. One "bus clock" is a full cycle starting at the rising edge of PHI1 through the falling edge of PHI1, the rising edge of PHI2 and the falling edge of PHI2 until the next rising edge of PHI1. The basic bus cycles can be extended by adding additional wait cycles, TbW, in order to support slow memory and peripheral devices. When no request for the bus is pending, the bus state is called idle state, Ti. FIG. 9 presents a simplified bus state diagram (it does not show the effect of some events, like internal references and asserted SFHOLDP, etc.). The Ta state of a bus cycle might overlap with Tb and/or TbW states of the previous bus cycle.

Basic Read and Write Cycles

Figure 10:
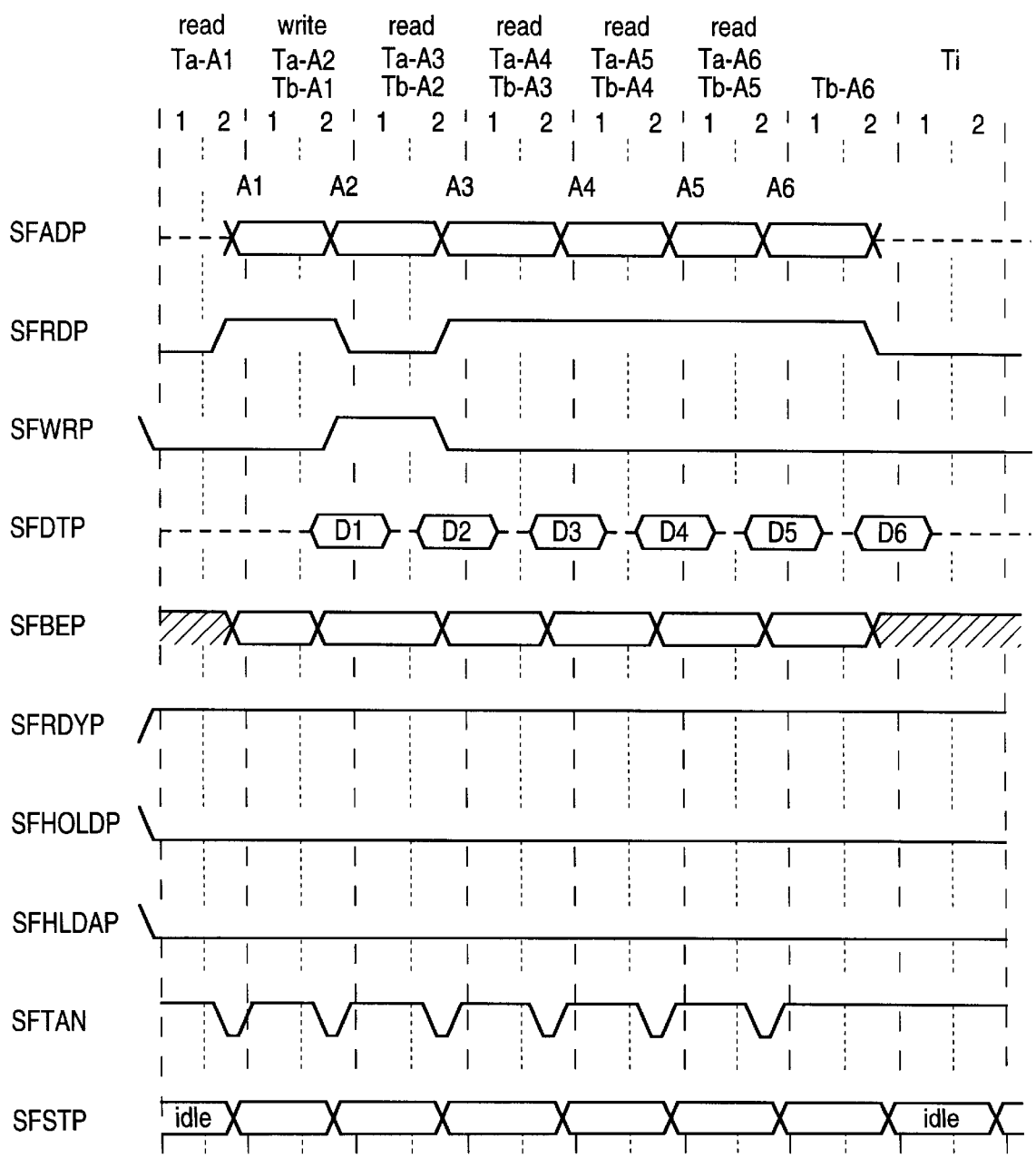
FIG. 10 is a timing diagram for basic read and write bus cycles.

The bus timing for basic read and write bus cycles is shown in FIG. 10. The CPU core operates the basic 2-state (Ta, Tb) bus. The Ta state of the next bus cycle may overlap with Tb. With maximum throughput, a new address is issued every cycle on the address bus, and a new data is received/issued every cycle on the data bus. The bus cycles can be extended using the SFRDYP input, as explained below.

Read Cycle

The CPU core starts a data read access by placing the exact address of the operand on the address bus 54. The SFTAN signal is asserted to indicate the validity of the address. The SFRDP signal is asserted along with the address placing and marks a read transaction. The SFBEPO-3 signals are asserted to select the specific bytes to be read. The bus status information is placed on the status bus (SFSTP) in conjunction with the address. All the above activities take place during the Ta state. At the end of the next cycle (Tb) the data is expected on the data bus 48 (SFDTP). The Tb state is overlapped with the Ta state of the next transaction. Thus, while receiving the first operand data, the CPU core issues the address and control signals of the next operand, thereby yielding a one-cycle throughput in the read transactions.

Write Cycle

The write cycle starts by asserting the SFTAN signal and by placing the address of the location to be written on the address bus 54 (SFADP). The SFWRP signal, which marks a write transaction, and the bus status information are issued at the same time. The SFBEPO-3 signals are asserted to select the specific bytes to be written. The data to be written is placed on the data bus 48 (SFDTP) at the end of the next cycle (Tb). The Tb state of the write transaction is overlapped with the subsequent Ta state, thereby yielding a one-cycle bus throughput.

Bus Cycle Extension

Figure 11:
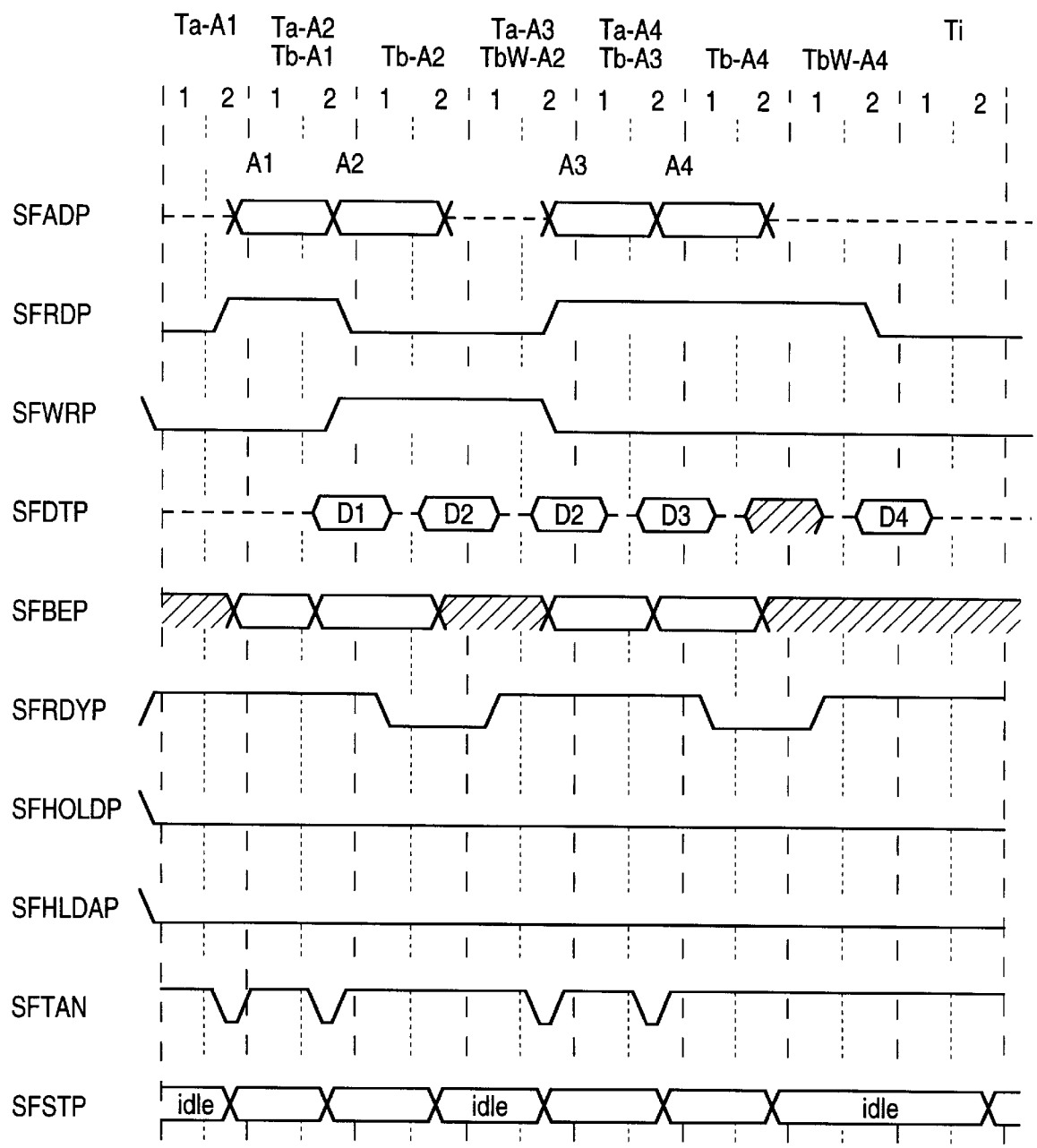
FIG. 11 is a timing diagram for extended read and write bus cycles.

These basic read and write bus cycles described above can be extended to support longer access times by adding TbW (Tb wait) states. The SFRDYP input can be used to extend the bus cycles. The input is sampled by the CPU core at the beginning of the Tb state and at the beginning of each TbW state (if any). If the SFRDYP is not asserted, then the bus cycle is extended by adding one TbW wait state. The SFRDYP is sampled at the beginning of each TbW state and, if it is not asserted, the bus cycle is extended by a TbW for another clock. FIG. 11 shows the extension of read and write bus cycles.

Interrupt Acknowledge Bus Cycles

The CPU core generates an Interrupt Acknowledge bus cycle in response to enabled Maskable Interrupt, Non-maskable Interrupt or ISE Interrupt requests. The timing for an Interrupt Acknowledge bus cycle is the same as the basic read cycle, only the status differs from that of bus cycles that access memory. During the exception process (i.e. interrupts and traps), the processor generates a sequence of memory read and write operations called interrupt acknowledge. Further details are available from data sheets of the NS32CG16 processor, for example, regarding the interrupt technique.

Byte Enables

The CPU core performs bus accesses during read and write sequences, using the Byte Enables SFBEPO-3. The Byte Enables indicate which bytes in the double word (i.e. 32 bit) are accessed. The accesses should be aligned according to the operation length. Only accesses as described in TABLE 2 are allowed. The CPU core needs to trap non-aligned accesses in order to prevent illegal accesses on the bus. For example, in the case when the data transfer (during LOAD or STORE) is not aligned according to the operation length, the Trap NAD (non-aligned data) sequence is performed as, for example, when a double word LOAD is performed from the memory location where the two least-significant address bits are other than "00". The data alignment on the data bus should be handled according to the lower bits of the address and the data width, as pointed out by the byte enable signals. For example, when data is to be written to byte no. 1, then byte enable no. 1 is active and the data should be placed on data bits 8–15. On WRITE transactions, it is the responsibility of the core to place data on the lines for the correct data bits, and on READ transactions the CPU core should expect the data on these lines. To meet these requirements, a data alignment technique is implemented in the CPU core, as explained above. TABLE 2 specifies the Byte Enables values during various bus accesses.

TABLE 2

| Access Length | Address A1 A0 | Byte Enables (SFBEPO-3) BE3 | BE2 | BE1 | BE0 |
|---|---|---|---|---|---|
| Double word (4 bytes) | 00 | 1 | 1 | 1 | 1 |
| Word (2 bytes) | 00 | 0 | 0 | 1 | 1 |
|  | 10 | 1 | 1 | 0 | 0 |
| Byte | 00 | 0 | 0 | 0 | 1 |
|  | 01 | 0 | 0 | 1 | 0 |
|  | 10 | 0 | 1 | 0 | 0 |
|  | 11 | 1 | 0 | 0 | 0 |

Features of CPU Core

In addition to handling read/write transactions, it is highly desirable that CPU core 28 also provide the following features: extended bus transaction (already described above), the ability to cancel bus transactions, and the ability to allow other "bus users" to gain control over the bus. The latter two are discussed below.

Canceling Bus Transactions

In the accesses which cause a Trap NAD (non-aligned data trap), the SFCANP signal is issued in Tb. The system should use this signal to prevent memory write and memory/IO read, especially if this read is destructive. In any case, the CPU core prevents the writing of the data from the data bus to the destination register. Thus, its value remains unchanged. The ability to cancel an already started bus transaction is important in order not to stall initiation of the transaction until all the exception conditions are checked. For example, the NAD trap (non-aligned data) conditions are known only one cycle after the address has been calculated and the bus transaction issued. The cancel feature avoids the need to stall initiation of a LOAD/STORE transaction for one cycle which would be used for resolving traps, for example.

Figure 15:
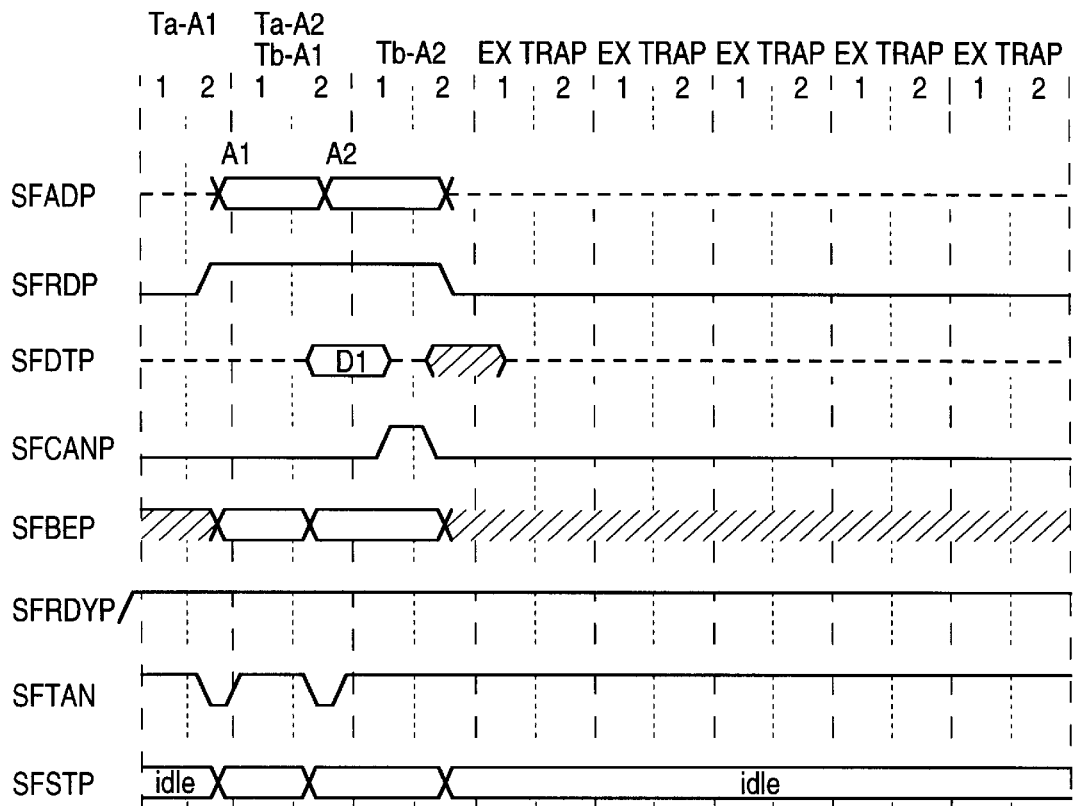
FIG. 15 is a timing diagram for a cancelled read transaction.
Figure 16:
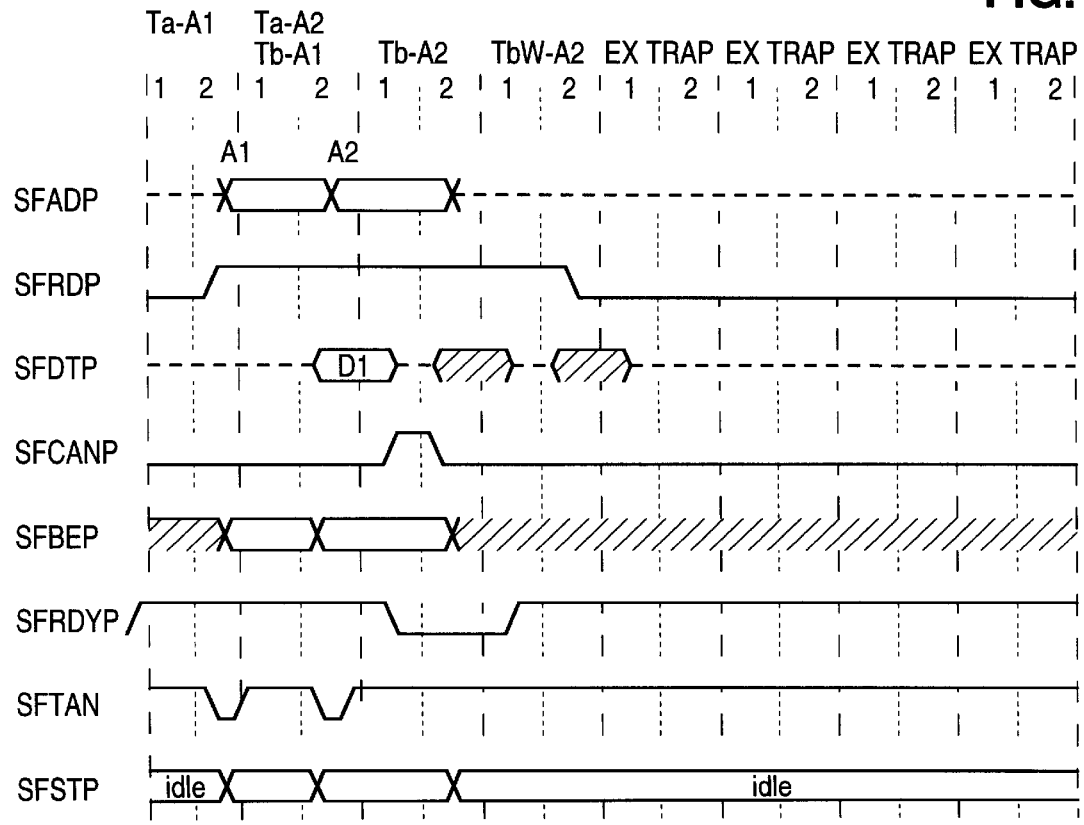
FIG. 16 is a timing diagram for a cancelled read transaction with an extended bus cycle.
Figure 17:
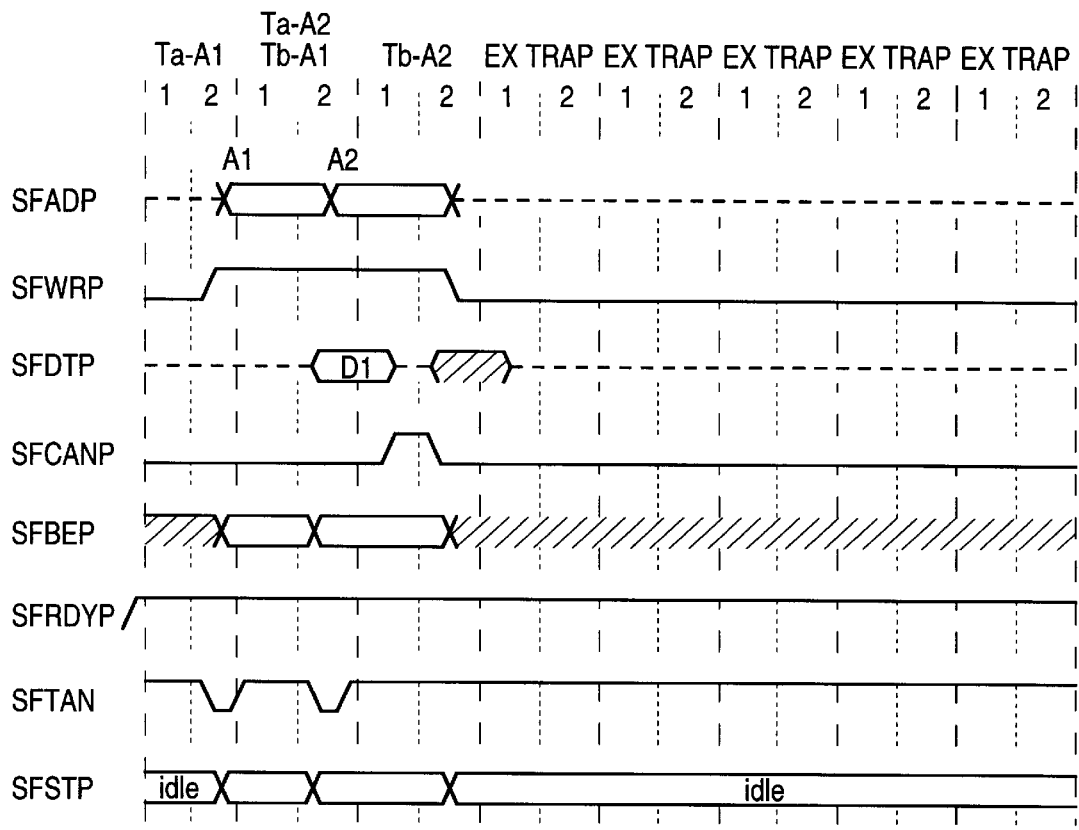
FIG. 17 is a timing diagram for a cancelled write transaction.
Figure 18:
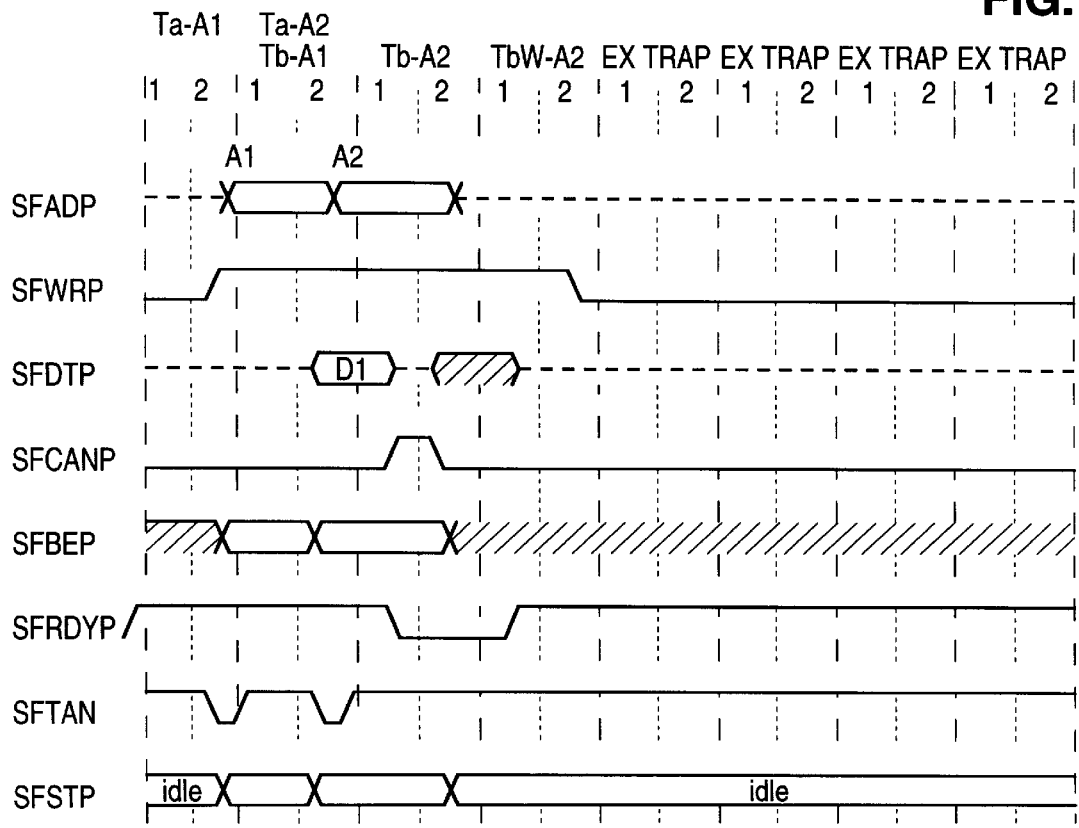
FIG. 18 is a timing diagram for a cancelled write transaction with an extended bus cycle.

FIG. 15 illustrates cancellation of a READ bus-cycle by asserting the SFCANP signal. The cancelled cycle is Ta-A2. FIG. 16 illustrates cancellation of an extended READ cycle (i.e. read with wait states). The cancelled cycle is Ta-A2. FIGS. 17 and 18 are cancellations occurring when writing data, and correspond respectively to FIGS. 15 and 16.

Bus Access Control

Figure 12:
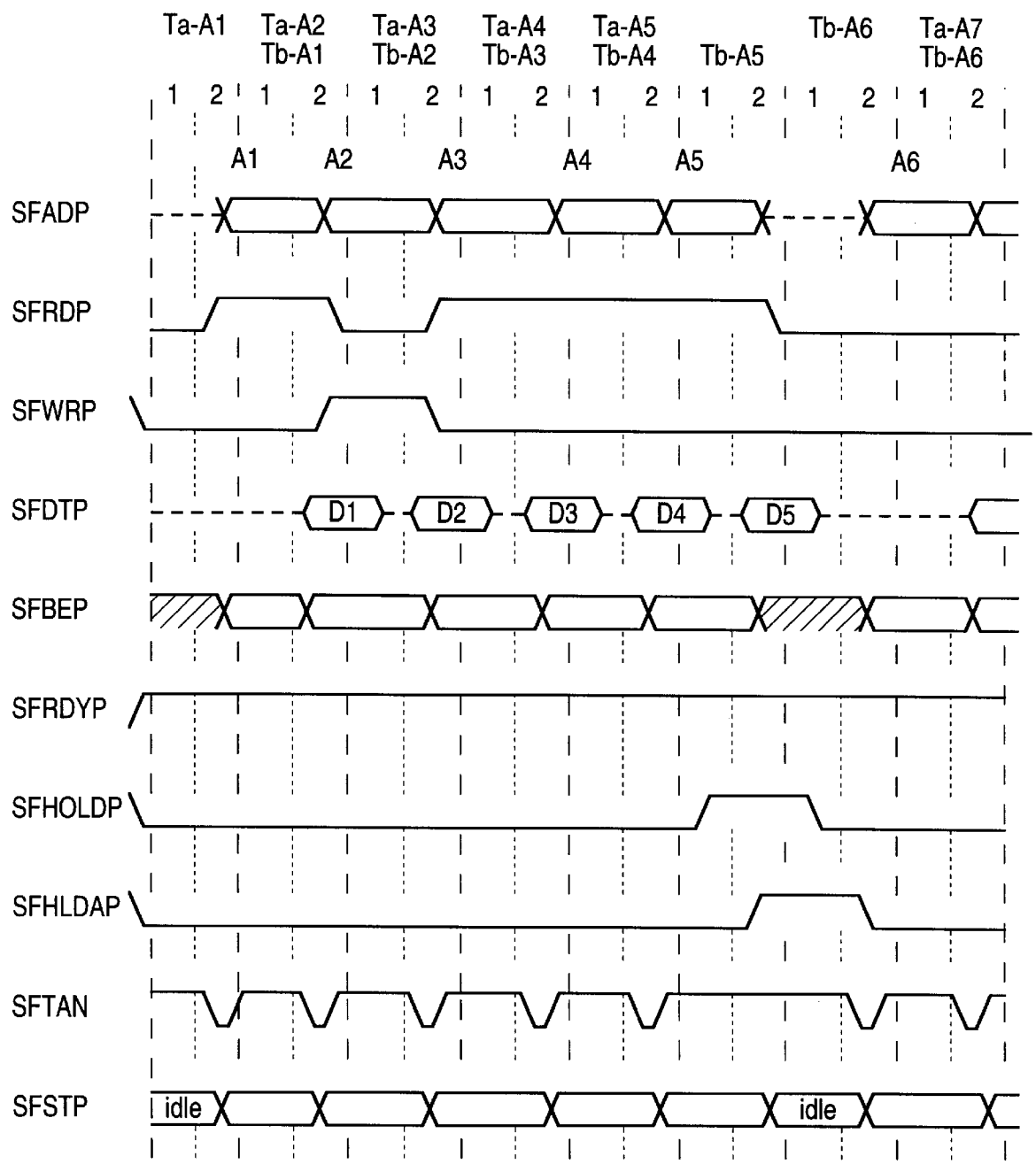
FIG. 12 is a timing diagram for a one cycle bus stall caused by a HOLD request.
Figure 13:
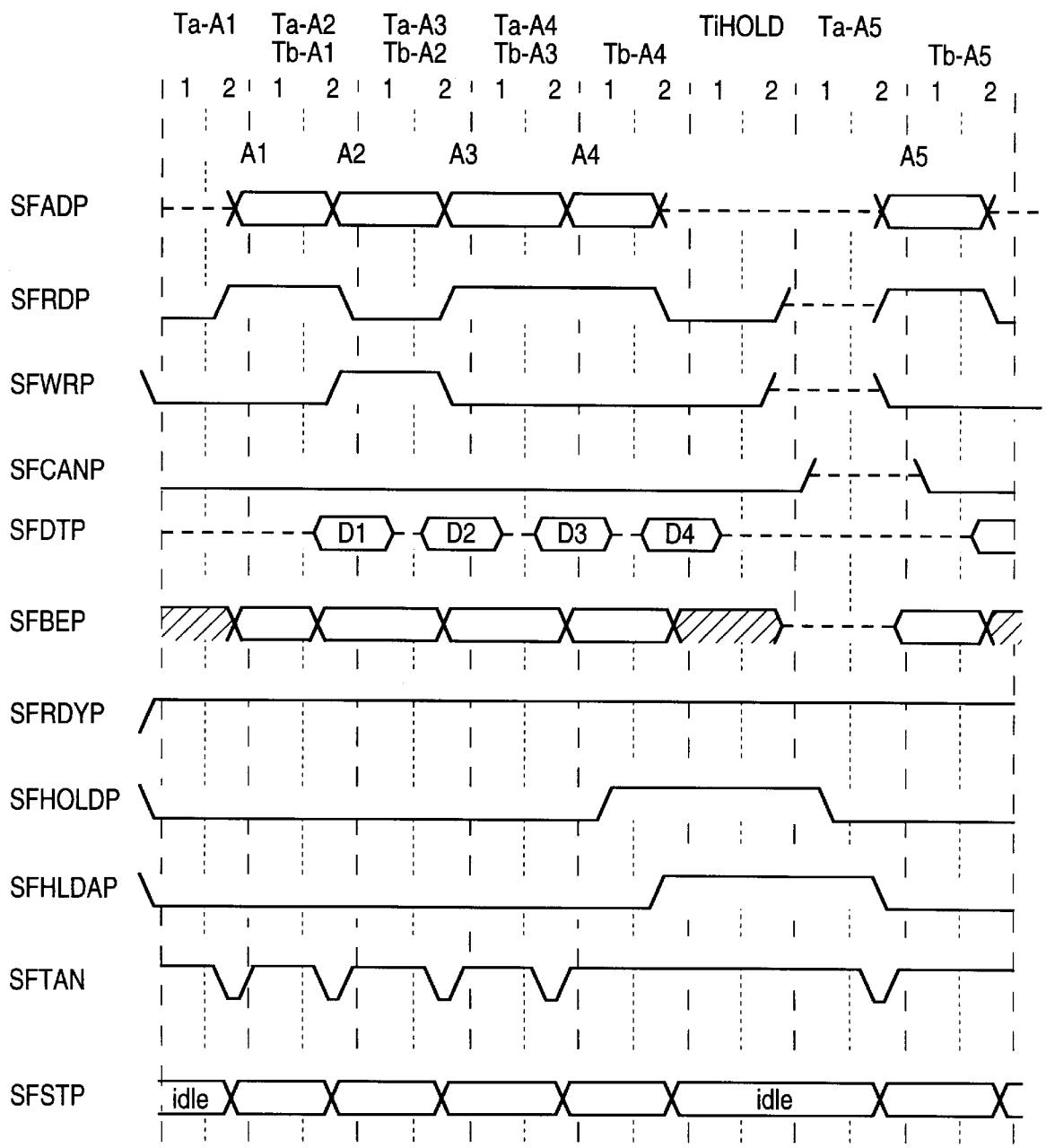
FIG. 13 is a timing diagram for the HOLD and HOLD Acknowledge bus cycle.
Figure 14:
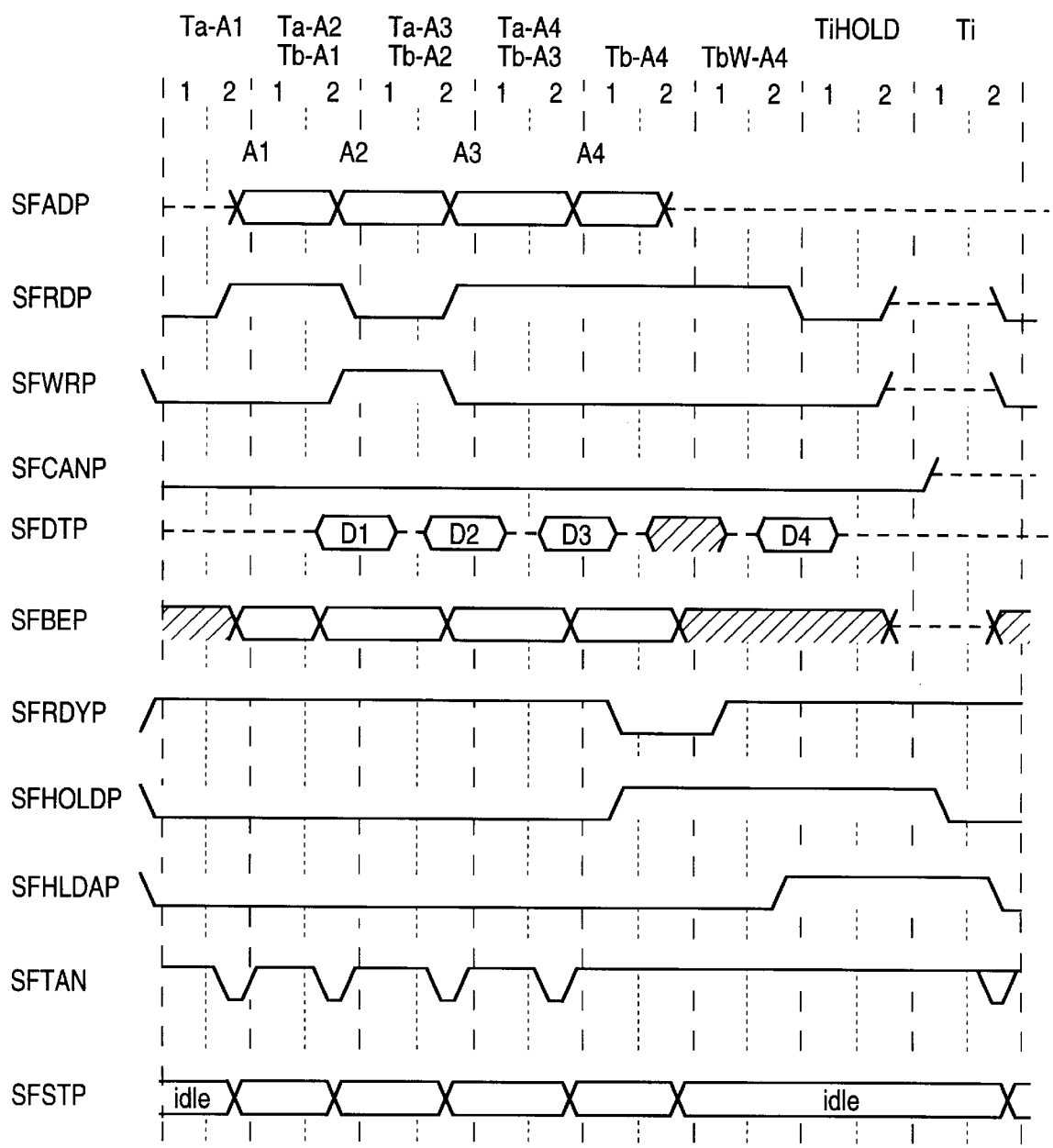
FIG. 14 is a timing diagram for a HOLD request received during an extended bus cycle.

The CPU core has the capability of relinquishing its access to the bus upon request from another bus user (such as a DMA unit). This capability is implemented with the SFHOLDP and SFHLDAP signals. FIGS. 12, 13 and 14 show the response of the CPU core to signal SFHOLDP. By asserting SFHOLDP, an external device requests access to the bus. On receipt of SFHLDAP from the CPU core and while SFHOLDP is held active, the device may perform bus cycles, as the CPU core at this point has placed SFADP, SFCANP, SFDTP, SFRDP, SFWRP, SFBEP in Tri-State. Also, SFTAN is not driven active by the core. To return control of the bus to the CPU core the device drives SFHOLDP low, and the CPU core acknowledges return of the bus by driving SFHLDAP low.

The CPU core samples SFHOLDP at the beginning of each Tb cycle. If SFHOLDP is asserted, then SFHLDAP is asserted at the end of Tb. As shown in FIG. 12, the Ta cycle (if pending) is not initiated. The bus is not relinquished yet. If SFHOLDP is still asserted in the beginning of the next cycle, then the bus is relinquished at the end of that cycle. Thus, asserting SFHOLDP for one cycle will cause only stalling of the Ta cycle, but not the bus relinquishing. If the bus cycle is extended because the system de-asserts (low) the SFRDYP input, as in FIG. 14, the CPU core asserts SFHLDAP only after the SFRDYP input becomes high and the extended Tb is completed.

Accessing Off-chip Devices

With the above-described simplified bus control arrangement, CPU core 28 operates with on-chip RAM 32 which provides working space and holds run-time data. On-chip peripherals 34 reduce the system cost by putting on chip peripherals such as an interrupt control unit, UART or other types of I/O devices. RAM 32 and peripherals 34 are all memory-mapped device accessed by the read and write transactions of the core.

FIG. 3 shows a system configuration that includes both on-chip and off-chip devices. The on-chip devices are directly connected to the core buses 48, 54 and 55. The off-chip devices DRAM 67 and EPROM 69 are accessed by the CPU core via the system BIU 65 and bus 66. The core buses 48, 54 and 55 see the system BIU 65 as another memory-mapped device. The system BIU 65 translates the on-chip bus transactions to meet the off-chip system requirements.

The system BIU 65 in the ASP is customized to fit the requirements of the off-chip system configuration or specific application requirements. It has the minimum set of features required, with no redundant features. For example, if the external bus 66 is 16 bits wide, the system BIU 65 converts the internal 32-bit buses to 16-bit wide transactions (transaction split).

The system BIU 65 may provide direct interface to DRAM devices 67 and EPROM devices 69 (generating appropriate controls). Various specific implementations of system BIU 65 will readily occur to one ordinarily skilled in the art from the description of the present invention provided herein. For example, system BIU 65 includes a programmable wait-state generator that allows direct interface to devices with various access times. If features (such as 32 and 8-bit bus, bus burst or dynamic wait states) are not required in the application, the ASP-tailored system BIU will not support them. When the CPU core includes a BIU, these features may be part of the core BIU and are, therefore, redundant in the ASP. On the other hand, bus features such as the DRAM controller and wait-state generator must be implemented in the system BIU (but not in the core BIU) in both (1) the conventional approach of using a core BIU tuned for off-chip operation, and (2) the approach of the present invention of using a core BIU tuned for on-chip operation, and there is no advantage in implementing approach (1). Adopting approach (2) is always preferable as being more advantageous.

The performance during access to on-chip devices is not degraded by the presence of the external memories. This allows mixing fast on-chip devices and slow off-chip devices to obtain the optimum performance.

Accessing On-chip Devices

Figure 19:
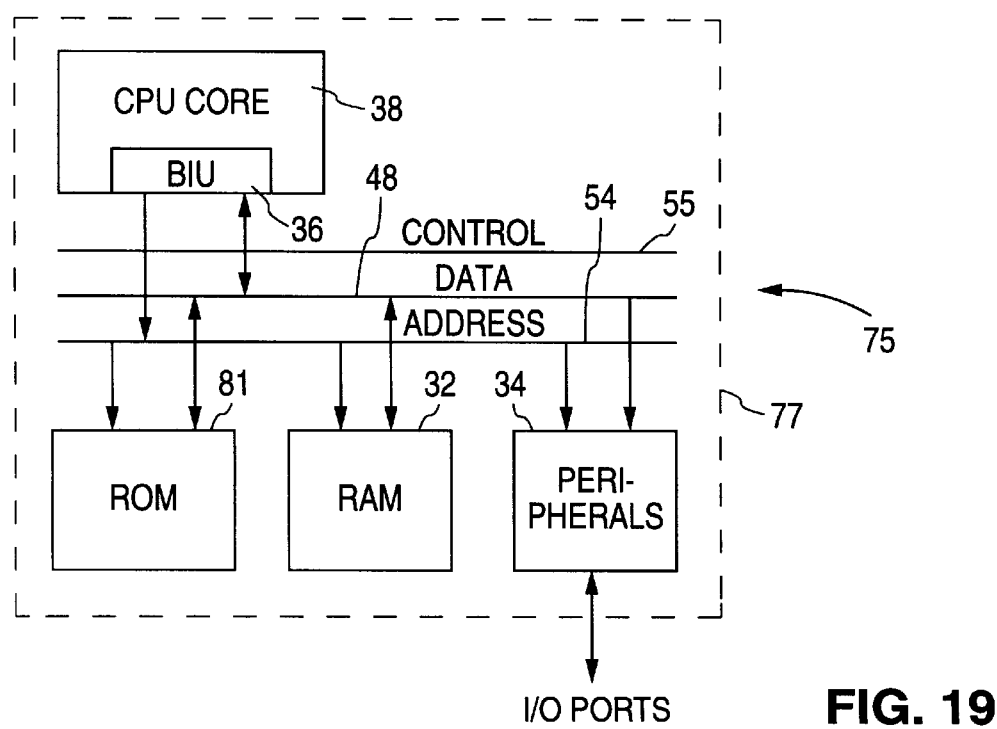
FIG. 19 is a schematic block diagram illustrating an embedded processor system in accordance with the invention, and having no off-chip devices.

FIG. 19 shows an ASP unit 75 that does not support any memory devices which are off chip 77. On-chip RAM 32 provides working space and holds run-time data. The on-chip ROM 81 holds all the required code and constant data. On-chip peripherals 34 provide the required interface to the external system. Various peripheral devices, such as ports or an interrupt controller, are used. The RAM, ROM and various modules are all memory-mapped devices accessed by the read and write transactions of CPU core 28. Since all the accesses are on-chip, this system does not need to generate any type of external memory control signal, and a system BIU is not implemented.

In this example, the ASP cost is reduced by not implementing off-chip memory support functions. In addition, the on-chip tuned bus with on-chip ROM and RAM significantly speeds-up access to the memories, providing performance higher than would be obtained with off-chip instruction-cache and data-cache.

Conclusion

Figure 1:
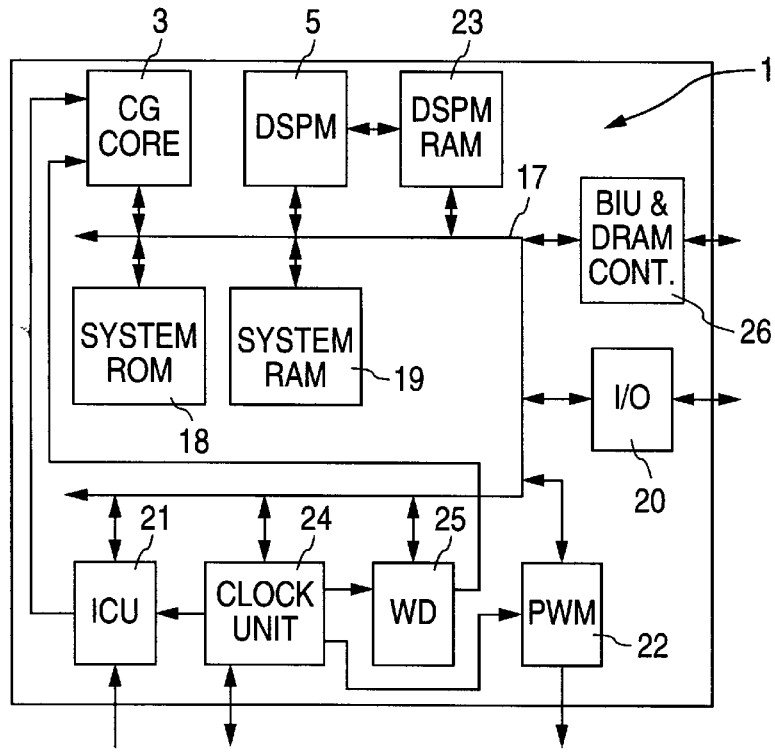
FIG. 1 is a schematic block diagram illustrating an embedded processor system architecture of the prior art.
Figure 2:
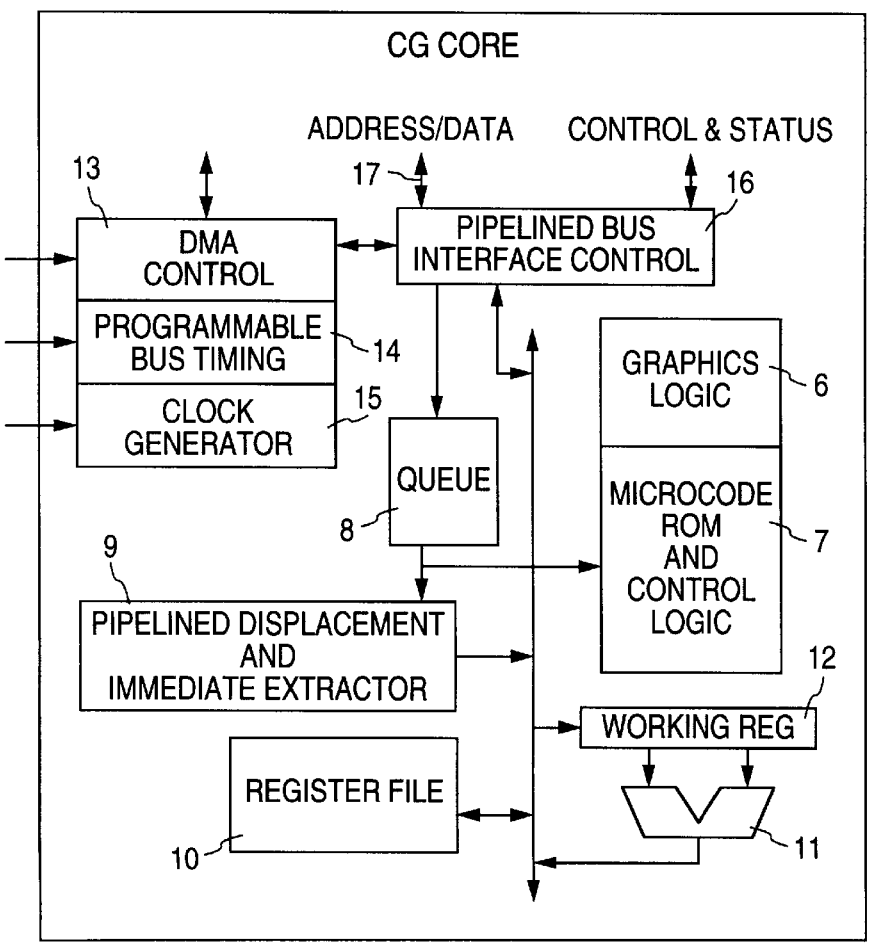
FIG. 2 shows details of a prior art CPU core used in the system of FIG. 1.

It is readily evident from the above that core BIU 36 for communicating information on on-chip buses 48 and 54 has been tuned for on-chip devices in a number of ways in accordance with principles of the present invention. For example, the ASP achieves a one cycle throughput (i.e. in each clock cycle a new bus cycle (transaction) can be issued) and a two cycles latency (i.e. it takes two cycles from the start of a READ bus cycle until the data is received). Such performance is achieved by conventional buses only in a very expensive system and bus, but it is accomplished economically with the present invention because it does not use a multiplexed address/data bus. If a multiplexed bus were used, the best possible performance would be a two cycle throughput. Also, no multiplexing and demultiplexing circuitry is required for the bus of the present invention. The two cycle bus latency is significant because bus latency is problematic in performing branch/jump instructions, for example. The use of a cancel signal (SFCANP) also contributes to this reduced latency in issuing the transaction because it allows the transaction to be issued immediately upon the address being calculated, for example, rather than waiting one cycle which would be used for resolving trap conditions. Moreover, no unused features have been included. The tuning of the bus as described above renders unnecessary the inclusion of support for different bus widths. Furthermore, a wait states generator (which is needed in the CG core of FIG. 2, as pointed out in the data sheets of the NS32CG1G device) is not needed. In addition, bus buffer control signals (such as DBE used in the CG core) are not needed. Thus, aside from simplifying the design and reducing the cost of an ASP, a significant gain in performance is achieved.

The bus controls of the present invention are relatively simple because only three signals (i.e. SFTAN, SFRDP and SFWRP) are required as a minimal set of control signals to perform basic READ and WRITE operations. Other advantageous aspects of the present invention include use of HOLD/HOLDA which enables sharing of the bus by a number of bus masters. It also permits generating stalls on the bus. In addition, the use of SFRDYP allows extending the bus cycle to support slow devices.

Although the above-provided description of the invention sets forth specific details thereof, various modifications thereto are readily apparent to one with ordinary skill in the art. For example, slave or co-processor units can be added with their respective support signals. Instruction and/or data cache can be added with their respective support signals. Units such as the barrel-shifter and multiplier can be added to or removed from the CPU core. Non-bus signals (such as INT, NMI and SFPES) can be eliminated, and others added. Status indication signals, such as SFSTP, can be eliminated or added. The byte enable system can be changed to one that indicates the number of bytes read or written instead of the accessed bytes. Also, instead of an ALU an adder can be used, as can a dedicated adder for performing address calculations. A single clock bus can be used, instead of PHI1 and PHI2, which counts on both high and low portions of the clock signal. The HOLD/HOLDA approach can be changed so that the CPU core will output a bus request and will issue a bus cycle only after receiving a bus grant. While it has been indicated above that only use of the three SFTAN, SFRDP and SFWRP signals is required, other combinations can also be used for controlling basic READ and WRITE operations such as SFTAN with only data direction signals, or only read and write signals. These and all other such modifications are intended to fall within the scope of the present invention as defined by the following claims.

We claim:

1. A microprocessor-based data processing apparatus, comprising:

a central processing unit ("CPU") core;

at least one memory device integrated on-chip with said CPU core and mapped into a memory map of the CPU core for storing data at assigned address locations;

a data bus;

an address bus;

accessing means for communicating said CPU core with said at least one memory device via said data bus and said address bus by READ and/or WRITE transactions carried out during bus cycles, one of said transactions being completable during one of said bus cycles, each of said bus cycles being a two state cycle having a first state and a second state, said first state for a current one of said bus cycles overlapping said second state for an immediately preceding one of said bus cycles, so that said accessing means achieves a one cycle throughput and a two cycle latency; and a control bus, wherein said accessing means samples the control bus during said second state of said current bus cycle and during each wait state of said current bus cycle, if any, to detect whether a cycle extension control signal is active, in response to said cycle extension control signal being detected to be active, said accessing means extends said current bus cycle by a wait state and delays a succeeding bus cycle by the wait state; and in response to said cycle extension control signal not being detected to be active, said accessing means commences a first state of a succeeding bus cycle during the second state of said current bus cycle wherein said accessing means responds to an accessing request signal placed on the control bus by a device external to said CPU core for relinquishing said data bus and said address bus;

said accessing means samples said control bus during each one of said bus cycles for the presence of said access request signal, and generates an acknowledgement signal in response thereto;

said accessing means generates said acknowledgement signal in the same bus cycle in which the presence of said access request signal is detected; and said accessing means relinquishes said address and data buses only if the presence of said access control signal is again detected in a bus cycle immediately succeeding the one in which said acknowledgement signal is generated.

2. A microprocessor-based data processing method for us with a central processing unit ("CPU") core, and at least one memory device integrated on-chip with said CPU core and mapped into a memory map of the CPU core for storing data at assigned address locations, a data bus, an address bus and a control bus, said method comprising the steps of:

communicating the CPU core with the at least one memory device via said data bus and said address bus by READ and/or WRITE transactions carried out during bus cycles; and enabling one of said transactions to be completable during one of said bus cycles by arranging each of said bus cycles to have a first state and a second state, with said first state for a current one of said bus cycles overlapping said second state for an immediately preceding one of said bus cycles, so that a one cycle throughput and a two cycle latency is achieved;

sampling a control bus during said second state of said current bus cycle and during each wait state of said current bus cycle, if any, to detect whether a cycle extension control signal is active, in response to said cycle extension control signal being detected to be active, extending said current bus cycle by a wait state and delaying commencement of a succeeding bus cycle by at least the wait state;

in response to said cycle extension control signal not being detected to be active, commencing a first state of a succeeding bus cycle during the second state of said current bus cycle responding to an accessing request signal placed on the control bus by a device external to said CPU core by relinquishing said data bus and said address bus, wherein said step of communicating includes sampling said control bus during each one of said bus cycles for the presence of said access request signal, and generating an acknowledgement signal in response thereto;

said step of generating said acknowledgement signal occurs in the same bus cycle in which the presence of said access request signal is detected; and said step of relinquishing said address and data buses occurs only if the presence of said access control signal is again detected in a bus cycle immediately succeeding the one in which said acknowledgement signal is generated.

* * * * *

UNITED STATES PATENT AND TRADEMARK OFFICE
CERTIFICATE OF CORRECTION

PATENT NO.: 5,822,779
DATED: October 13, 1998
INVENTOR(S): GIDEON INTRATER et al.

It is certified that one error appears in the above-identified patent and that said Letters Patent is hereby corrected as shown below:

Col. 15, line 41, delete "us" and replace with --use--.

Signed and Sealed this

Nineteenth Day of January, 1999

Attest:

Attesting Officer

*Acting Commissioner of Patents and Trademarks*